(12) United States Patent (10) Patent No.: US 7,860,770 B2
Ciampi et al. (45) Date of Patent: Dec. 28, 2010

(54) FAIR-VALUE PRICING OF A FINANCIAL ASSET

(75) Inventors: Peter L. Ciampi, Lexington, MA (US); Eric Zitzewitz, Cambridge, MA (US)

(73) Assignee: Interactive Data Pricing And Reference Data, Inc., Bedford, MA (US)

( * ) Notice: Subject to any disclaimer, the term of this patent is extended or adjusted under 35 U.S.C. 154(b) by 126 days.

(21) Appl. No.: 11/605,031

(22) Filed: Nov. 27, 2006

(65) Prior Publication Data
US 2007/0078746 A1  Apr. 5, 2007

Related U.S. Application Data

(63) Continuation of application No. 09/835,605, filed on Apr. 16, 2001, now Pat. No. 7,167,837.

(51) Int. Cl.
    *G06Q 40/00* (2006.01)
(52) U.S. Cl. .................. 705/35; 705/36 R; 705/37; 705/38

(58) Field of Classification Search .............. 705/35–38
    See application file for complete search history.

(56) References Cited

U.S. PATENT DOCUMENTS 6,832,211 B1 * 12/2004 Thomas et al. ............ 705/36 R

* cited by examiner

*Primary Examiner*—Daniel S Felten
(74) *Attorney, Agent, or Firm*—Cowan, Liebowitz & Latman; Steven D. Underwood

(57) ABSTRACT

The fair value of a fund is determined by analyzing various factors indicative of how each underlying asset of the fund would be valued on the open market. The fund may be an international mutual fund that includes underlying assets, which include international equities. Because some of the underlying assets may not be traded in a liquid market at the time of valuation of the fund, a reliable estimate of the value of such underlying assets must be made based on available data related through historical correlations. The fair value of the fund is determined based on the estimated or actual values of each of the underlying assets.

14 Claims, 3 Drawing Sheets

```
                          ← 200
```

| Determine a first amount by multiplying a first coefficient by a difference between the most recent closing price of the asset and the most recent price of a depository receipt. |
|---|
| 202 |

| Determine a second amount by multiplying a second coefficient by a difference between the most recent closing price of the asset and the second most recent closing price of the asset. |
|---|
| 204 |

| Determine a third amount by multiplying a third coefficient by a difference between the most recent closing price of the depository receipt and the second most recent closing price of the depository receipt. |
|---|
| 206 |

| Determine a fourth amount by multiplying a fourth coefficient by a rate of change of an index price. |
|---|
| 208 |

| Determine a fair value price for the asset by summing the amounts. 210 |
|---|

FAIR-VALUE PRICING OF A FINANCIAL ASSET

CROSS REFERENCE TO RELATED APPLICATIONS

This application is a continuation application of U.S. patent application Ser. No. 09/835,605, filed Apr. 16, 2001 now U.S. Pat. No. 7,167,837. The entire contents of that application are incorporated herein by reference.

BACKGROUND

An investor who wishes to put funds into a mutual fund, that is buy shares of the mutual fund, typically pays the share price as of the end of the trading day for the mutual fund. Similarly, when an investor wishes to redeem funds, that is sell shares in the mutual fund, the share price is typically determined at the end of the trading day. Since the closing price is the price at which the transactions occur, determining the share price of the mutual fund at the close of the trading day is of great importance.

U.S.-based mutual funds with underlying assets that are traded on foreign exchanges typically use the closing prices of the foreign assets on the foreign exchange to determine the share price of the mutual fund. U.S.-based mutual funds typically determine the price of the fund at 4:00 PM Eastern time. Since the trading of the underlying assets of such a mutual funds close at different times than the mutual fund, the closing price for the foreign asset may not accurately reflect the value of the underlying assets of the mutual fund at 4:00 PM Eastern time. This may result in the mutual fund being under-valued or over-valued. The closing price of an asset is said to be "stale" when it no longer reflects the current value of the asset. The problem of using stale prices for underlying assets is more pronounced in volatile markets.

Arbitrageurs often take advantage of mutual funds that use stale pricing at the expense of other investors in the mutual funds. Arbitrageurs will buy shares of funds when the fund is undervalued and sell the shares when the fund is overvalued. Some U.S.-based mutual funds with underlying assets that are traded on foreign exchanges have attempted to limit such dilution by imposing higher short term trading fees, limiting the number of trades in a period of time, and blocking execution of some trades. These measures prevent only some of the dilution.

Stale prices may occur in other situations. Mutual funds may include assets that are normally traded during the same hours as the mutual fund but for some reason are not traded during a portion of a particular day. For example, thinly traded U.S. securities may have large periods of time when no shares are traded. The last trade of the day for such a stock could be an hour or more before the price of the mutual fund is determined. A stock may not trade for other reasons including: the trading in a stock may be halted for one of many reasons, including, the trading range maximum has been reached; a natural disaster may close an exchange; the trading in a stock may be halted for only individual investors, while other investors can continue to trade; or a stock exchange may be closed for a holiday.

SUMMARY

The fair value of a fund is determined by analyzing various security market factors that contain information about how the underlying assets of the fund would be valued in a liquid market. The fund may be an international mutual fund whose underlying assets include international equities. Because some of the underlying assets may not be traded in a liquid market at the time of valuation of the fund, a reliable estimate of the value of such underlying assets must be made based on available data related through historical correlations. The estimation of the value of such assets provides an alternative to using stale prices for such assets and thus overvaluing or undervaluing the fund. The underlying assets that are traded in a liquid market at the time of valuation of the fund may be valued using the current trading price of the assets. The fair value of the fund is the value of its net assets with the values of these assets determined using either their actual or fair values.

The foregoing discussion has been provided only by way of introduction. Nothing in this section should be taken as a limitation on the following claims, which define the scope of the invention.

BRIEF DESCRIPTION OF SEVERAL VIEWS OF THE DRAWINGS

The present invention is illustrated by way of example in the accompanying figures. In the figures, like reference numbers indicate identical or functionally similar elements. Additionally, the left-most digit(s) of a reference number identifies the figure in which the reference number first appears.

FIG. 2 illustrates a flow diagram of a method of determining a fair-value of an underlying asset.

DETAILED DESCRIPTION

I. Introduction

Figure 1:
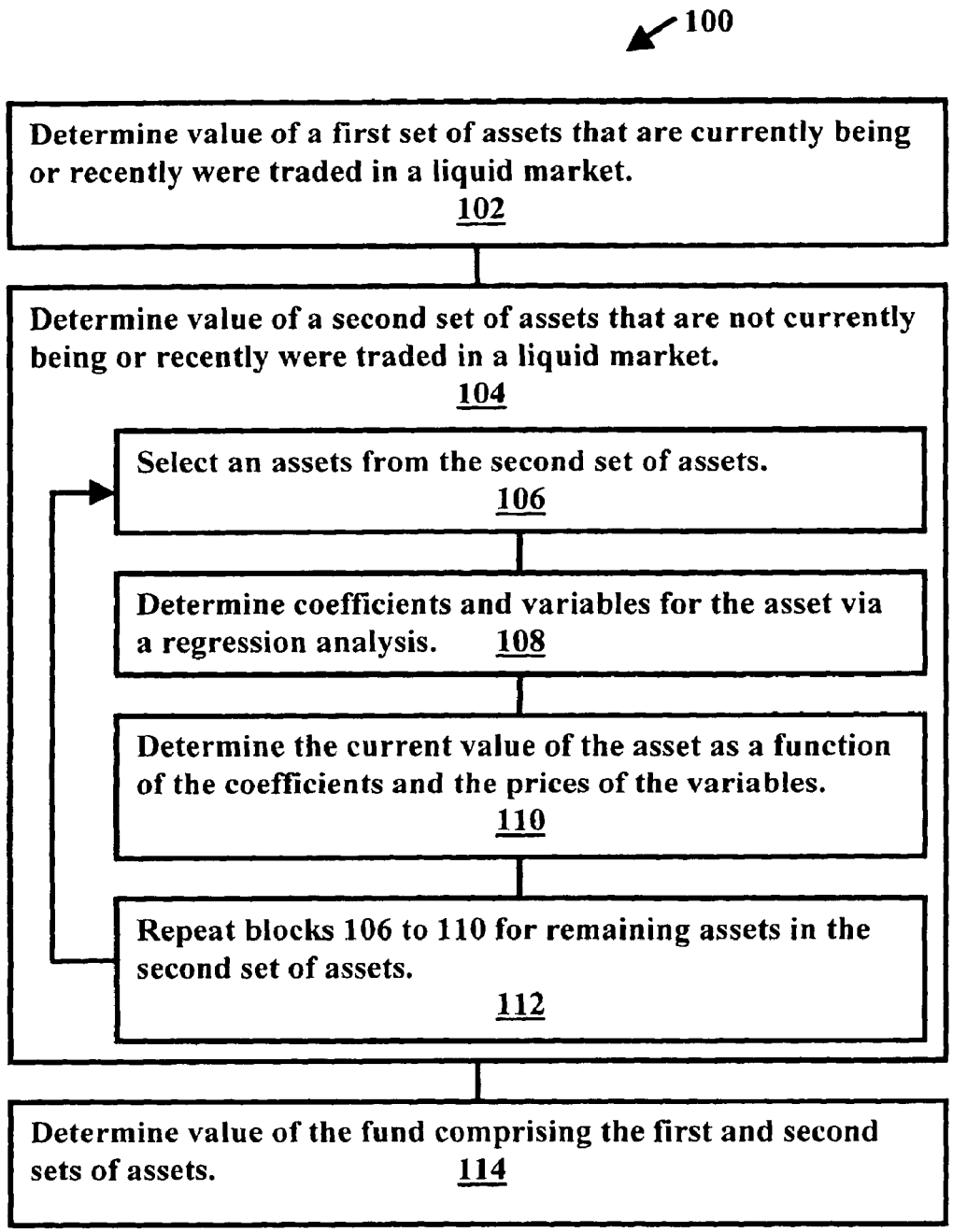
FIG. 1 illustrates a flow diagram of a method of determining a fair-value of a fund having underlying assets.

An improved valuation method and system is disclosed that provides a significantly more accurate method of valuation of mutual funds and other financial instruments that include underlying asset(s) that are not being traded in a liquid market when the valuation is performed. The improved valuation greatly reduces the opportunities for arbitrageurs to take advantage of over-valued or under-valued mutual funds. Thus, the dilution caused by the arbitrageurs at the expense of the long-term investors is greatly reduced or eliminated. The fair value determination allows the fund, such as an open-ended mutual fund, to be traded a price closer to the fund's true value. The fair value of the fund is determined by combining the fair value of each of the underlying assets.

The fair value price of an underlying asset that is not currently trading in a liquid market may be a function of historical price relationships between the asset and other financial prices. The fair value price is the price that would prevail in the most liquid market. Various financial assets that may be valued using this fair value methodology, include, but are not limited to: international equities, international bonds, domestic small-cap equities, domestic corporate bonds, municipal high-yield bonds, mutual funds that contain such assets, and other financial assets.

Determining a fair value of a fund by determining the fair value of each of the underlying assets provides several advantages over other techniques, such as using historical data to adjust the net asset value ("NAV") of a fund directly. While a similar valuation method, including similar regression and correlation techniques, could be applied at the fund level instead of at the underlying asset level to determine the NAV of the fund, such techniques have important shortcomings.

Relatively new funds lack enough historical data to perform a proper regression analysis, even when sufficient data exists for the underlying assets. Many funds change their underlying assets and the amount of each of the underlying assets over time. Any fund level valuation that includes fund level NAV data, before the mix of underlying assets changed, is of limited relevance and may produce questionable results. Because the NAV of funds are reported rounded to the nearest penny, a fund level valuation will have a rounding error. For example, the rounding error may be approximately 5 to 10 basis points for a fund with a NAV of $10. In contrast, in a valuation at the underlying asset level the rounding error will tend to converge to zero because the fund includes a large number of underlying assets, also called securities, and a large number of historical data points are used.

A fund may not have as high of a correlation with industry indices and geographic indices because the fund is more diverse then each underlying asset. For example, a fund may include underlying assets that are from several industry sectors and numerous countries. Some of the underlying assets may have a high correlation with an industry index and a geographic index and other underlying assets may have a high correlation with a different industry index and a different geographic index. The fund may not have a statistically significant correlation with either of the industry indices or the different geographic indices. Similarly, a depositary receipt may have a high correlation with an underlying asset and little correlation with the fund.

II. Definitions

American Depositary Receipt ("ADR")—A depositary receipt that represents shares of stock in an overseas corporation and is traded on an American exchange. A certificate issued by a U.S. depository bank, representing foreign shares held by the bank, usually by a branch or correspondent in the country of issue. One ADR may represent a portion of a foreign share, one share, or a bundle of shares of a foreign corporation. If the ADR's are "sponsored," the corporation provides financial information and other assistance to the bank and may subsidize the administration of the ADR.

Depositary Receipt ("DR")—a negotiable certificate that represents shares of a foreign company, fund or debt that is traded on a domestic stock market.

European Depositary Receipt ("EuroDR")—A depositary receipt that includes European assets.

Fair value—The price a financial asset would trade at in a liquid market.

Global Depositary Receipt ("GDR")—A depositary receipt similar to an ADR.

Holding Company Depositary Receipt ("HOLDRS")—A depositary receipt that represents ownership in a specified group of stocks and often focuses on a specific business sector.

Linear regression—A model describing the variation of a certain response variable as a linear combination of the effects of a set of predictors and a random error term.

Mutual fund—A pools of money that are managed by an investment company. Mutual funds offer investors a variety of goals, depending on the mutual fund and its investment charter. Some mutual funds seek to generate income on a regular basis. Other mutual funds seek to preserve an investor's money or seek to invest in companies that are growing at a rapid pace. Mutual funds can impose a sales charge, or load, on investors when they buy or sell shares. No-load mutual funds impose no sales charge.

Net Asset Value ("NAV")—The value of a mutual fund computed from the value of the value of the mutual fund's underlying assets.

NASDAQ—The National Association of Securities Dealers Automatic Quotation.

NYSE—The New York Stock Exchange.

"P-value"—A quantity calculated from sample data that indicates the probability of a getting a value of the test statistic at least as extreme as the value observed, if the null hypothesis H0, is true. A P-value is the smallest level of significance for which the statistic indicates the rejection of the null hypothesis. For example, the P-value that is typically calculated for a regression coefficient is the probability of obtaining the observed coefficient or a more extreme value if the true value of the coefficient were zero. P is computed from a given statistic such as a z-score, and if p is less than the level of significance, the null hypothesis is rejected. If p were greater than the level of significance you would fail to reject the null hypothesis.

R-squared (the "coefficient of determination")—A number that represents how well a line of best fit describes a relationship between two or more variables. The line of best fit may be a least squares line. The R-squared value is a number from 0 and +1. An R-squared value of zero implies that the line does not describe the relationship. An R-squared value of +1 indicates that the data values fall directly on the line of best fit and hence the line is a good description of the relationship between these two variables.

Standard & Poor's Depositary Receipt ("SPDR")—A depositary receipt that tracks the S&P 500 and trade on the American Stock Exchange under the symbol SPY.

Test statistic ("t-stat")—A quantity calculated from sample data that is used to decide whether or not the null hypothesis should be rejected. A large t-stat indicates rejecting the null hypothesis.

ISHARE—One of the 17 single-country index funds that are exchange-traded funds and track markets including Australia, Belgium, Hong Kong, and the United Kingdom.

III. Method of Determining a Fair Value

FIG. 1 illustrates a flow diagram of a method 100 of determining a fair value of a mutual fund that includes a first set of assets that are currently being or recently were traded in a liquid market and a second set of assets that are not currently being traded or recently were traded in a liquid market. The fund may be a mutual fund with underlying assets that include international equities or other assets that are not traded at the time when the fund is valued.

In block 102, the value of a first set of mutual fund assets is determined. The first set of assets may include assets that are traded in a liquid market on or about the time of the valuation. For example, if the mutual fund is a U.S.-based mutual fund that focuses on technology stocks, the domestic stocks, such as Cisco Systems, Inc. and Lucent Technologies, Inc., are most likely traded in a liquid market during or near the time of valuation. Such domestic stocks may be traded on the New York Stock Exchange ("NYSE"), the NASDAQ, or other exchanges. The mutual fund may be valued shortly after 4:00 PM Eastern time. The value of some of the assets in the first set of assets, for example, currencies, bonds, cash, and other financial instruments, may be established by means other than a stock exchange. If the mutual fund includes only international assets, the first set of assets may include no assets.

In block 104, the value of a second set of assets of the mutual fund is determined. The second set of assets may be traded during different hours of the day than the mutual fund. For example, the assets in the second set of assets may include foreign equities traded on stock exchanges, such as the Tokyo Stock Exchange, the Singapore Stock Exchange, the Australian Stock Exchange, or the London Stock Exchange. The value of a second set of assets of the mutual find may be determined via the method of blocks 106-110. While blocks 106-110 illustrate a method of determining the value of the second set of assets, other methods are also possible. For example, the coefficients and the variables may be determined for each of the assets before the current values for the assets are determined.

In block 106, an asset to be valued is selected from the second set of assets.

In block 108, a regression analysis of the asset selected in block 106 is performed to determine the variables and the coefficients for those variables. The variable may be only those variable that are statistically significant or that increase the R-squared value. A variable may be determined to be statistically significant at various levels such as for 0.1% to 10%, and preferably the 5% level. Each asset in the second set of assets may have different variables that are statistically significant to that asset's price. The variables may include recent changes in the value DRs, currency prices, industry indices, country indices, futures, interest rates, and other financial assets or indicators.

The fair value price may be determined using a regression technique that includes historical data on a rolling basis. The time-frame for the regression may be any period, such as, several months to ten years, or more. Various adjustments may be made to the historical data to compensate for various effects. For example, some of the related assets, such as, holding company depositary receipts are included in the estimation for only those days when their volume exceeds a predetermined level, such as 100,000 shares. Prices are eliminated from days where the related assets not traded or were only thinly traded to reduce the possibility of using uncharacteristic prices. Other adjustments may also be made.

The fair value of some assets may be determined using a first regression period and the fair value of other assets may be determined using a second regression period. Within the regression period, more recent data may be weighted more heavily than older data. Such weighting attempts to account for changes in the models parameters. The weighting may include geometric weighting.

Various regression techniques may be used to determine the fair value of the asset, such as multivariate linear regression, a polynomial regression, or other technique. The variables used in the regression may vary between assets and over time. The regression technique may include a multi-factor econometric regression analysis that uses historical pricing relationships between the fair value of an asset and the related assets. A related asset may include a stock, a bond, a market index, sector index, geographic index, a futures contract, a depositary receipt, a currency rate and/or other financial data.

For example, the regression may include a linear regression such as:

$$P_{t+1} - P_{t-1} = a + b^*(X_t - X_{t-1}) + c^*(Y_t - Y_{t-2}) + e \qquad \text{Eqn. 1}$$

Where:

P is a one dimensional table containing the historical prices for the asset whose fair-value is being estimated.

X is a vector of prices for a set of related assets. X may represent a 2 dimensional matrix where a first dimension is assets such as ADR, general index 1, general index 2, sector index 1, sector index 2, future 1, future 2, and a second dimension is the historical prices for these assets. The prices may be expressed in logarithms.

Y is also a 2-dimensional matrix similar to X but includes those assets which trade at t−2 relative to t and t−1. The prices may be expressed in logarithms.

a, b, and c are coefficients or vectors of coefficients. "e" is an error term.

Time "t" is the time of the fair value determination.

Time "t+1" is the time at which the asset will normally next trade in a liquid market.

Time "t−1" is the time at which the asset in vector X last traded in a liquid market.

Time "t−2" is the time at which asset in vector Y last traded.

The increments between time "t−2", time "t−1", time "t", and time "t+1" need not be equal increments. For example, if the fair value of a French equity is determined at 4:00 PM Eastern time, then time "t−2" may be the prior-day market close; time "t+1" may be the following-day market open or close in France, time "t" may be 4 PM Eastern time; time "t−1" may be the current-day market close in France (11:30 AM Eastern time).

The vector X may include the prices of assets that include the S&P 500 futures prices, the NASDAQ 100 futures prices, and/or prices of other futures contracts. Many futures contracts, including the S&P 500 and the NASDAQ 100, are traded 24-hours-a-day. Such related assets have prices available at both time "t" (e.g., 4:00 PM) and time "t−1" (e.g., 2:00 AM). The vector Y may include the prices of a U.S. equity in the same industry as the asset being valued, where that asset does not trade at time "t−1." The traded price for the asset in vector Y are known for times "t" and "t−2." The related assets that are included in the vectors X and Y may be different for determining the fair value of different assets and may change over time. The related assets included in the vectors X and Y are selected to achieve the best model performance. The best model performance may be defined as the model with the highest adjusted-R squared value (coefficient of determination). While many or all of the coefficients may be statistically significant in predicting the value of the asset, some coefficients may increase the adjusted-R squared value yet not be statistically significant. Such coefficient may be used in the predicting formula. An adjusted R squared value of 0.4 would predict 40% of the variance between today's price and the predicted price for tomorrow.

When the regression data is weighted using a geometric weighting function, the weight "ws" for observation "s" for a model estimated at time "t" may be determined using Equation 2. The variable "d" may be any value. When "d" is equal to 0.002, the data is down weighted by one-half for each year it is old.

$$ws = EXP(-d(t-s)) \qquad \text{Eqn. 2}$$

A stepwise-regression method is used to determine which of the specific market indices and other related assets build the best regression equation as described in Draper, N. R. and Smith, H. "Applied Regression Analysis" 335-338 (Wiley 3rd ed. 1998), which is incorporated herein by reference. Only the variables that contribute the most statistically significant predictive power to the fair-value calculation are used. For example, the related assets may include sector indices and depositary receipts listed in Table 1.

TABLE 1

Example of sector indices and depositary receipts

| Sector | S&P | Nasdaq | Amer-Exch | Phila-delphia | MSDW | Pacific | HOLDRS |
|---|---|---|---|---|---|---|---|
| Bank | BIX | BANK | | BKX | | | RKH |
| Financial | | | XBD | | | | |
| Brokers/Dealers | | | | | | | |
| Insurance | IUX | INSR | | | | | |
| Bio Tech | | | BTK | | | | BBH |
| Pharmaceuticals | | | DRG | | | | PPH |
| Health Care | HCX | | | | | | |
| Technology | | | XCI | | | PSE | |
| Semi-Conductor | | | | SOX | | | SMH |
| Networking | | | NWX | | | | |
| Tele Comm. | | IXTC | PHN | | | | TTH |
| Computer - Hardware | | IXCO | | | | | |
| Retail | RLX | | | | | | |
| Consumer | | | | | CMR | | |
| Cyclic | | | | | CYC | | |
| Airlines | | | XAL | | | | |
| Forest and Paper | | | | FPP | | | |
| Tobacco | | | | | | TOB | |
| REIT | | | | | | RMP | |
| Chemicals | CEX | | | | | | |
| Energy | | | DXE | | | EXV | |
| Utility | | | | UTY | | | UTH |
| Oil | | | XOI | | | | |

After selecting the variables using historical data, the current day's parameter values are inserted into Equation I and the predicted price difference, $P_{t+1}-P_{t-1}$, is calculated. This predicted value is then added to the most recent market price to generate the fair-value price. The prices may be represented in logarithmic form. The predicted price difference, $P_{t+1}-P_{t-1}$, can be viewed as an adjustment to the last closing price that reflects the changes in the price of assets in the vectors X and Y.

In block 110, the current value of the asset is determined as a function of the coefficients and the prices of the variables. The current value of the variables may be multiplied by the coefficients. The variables may include one to 50, or more variables.

In block 112, blocks 106 to 110 may be repeated for each of the remaining assets in the second set of assets.

In block 114, the fair value price of the mutual fund is determined. The fair value price comprises the value of the first and second sets of assets.

FIG. 2 illustrates a flow diagram of an example of a method 200 of determining a fair value of an asset that is not currently being traded in a liquid market.

In block 202, a first amount is determined by multiplying a first coefficient and a difference between the most recent closing price of an asset and the most recent closing price of a depositary receipt ("DR") price. The DR may be an American Depositary Receipt for the asset being valued.

In block 204, a second amount is determined by multiplying a second coefficient and a difference between the most recent closing price of the asset and the second most recent closing price of the asset.

In block 206, a third amount is determined by multiplying a third coefficient and a difference between a most recent closing price of a DR and a second most recent closing price of the DR.

In block 208, a fourth amount is determined by multiplying a fourth coefficient and a rate of change of an index. Block 208 may also include multiplying other coefficients and other indices as illustrated in Equation 3.

In block 210, a fair value price difference for the asset is determined as a function of the amounts from blocks 202-208. The fair value of the asset may be determined by adding the fair value price difference to the most recent closing price. Equation 3 illustrates an embodiment of the method of FIG. 2.

$$P_{d+1}-P_d=a*(P_{ADR}-P_d)+b*(P_d-P_{d-1})+c*(P_{ADR}-P_{ADR-1})+d*(\Delta S\&P)+e*(\Delta ISHARE)+f*(\Delta SECTORS) \quad \text{Eqn. 3}$$

$P_d$ is the price of the asset as of the last trade.

$P_{d-1}$ is the price of the asset as of a time period prior to the last trade.

a, b, c, d, e, and f are the coefficients determined by regression analysis.

$P_{d+1}$ is the price of the asset as of the next time period.

$P_{ADR}$ is the price of the ADR as of the last trade.

$P_{ADR-1}$ is the price of the ADR as of a time period prior to the last trade.

$\Delta S\&P$ is the rate of change of the Standards and Poor's index as of the last trade. The S&P index may be the S&P 500 index $\Delta ISHARE$ is the rate of change of the ISHARE index fund as of the last trade.

$\Delta SECTORS$ is the rate of change of a sector index as of the last trade. A sector index may be any relevant sector specific index or set of sector specific indices. The usefulness of sector indices in understanding the behavior of stocks is described in Robin Brooks and Luis Catao, "The new economy and global stock returns" (International Monetary Fund Working Paper 216) (2000), which is incorporated herein by reference.

Equation 3 determines the change in the price for an asset $(P_{d+1}-P_d)$ between the last traded price $P_d$ and the price the asset will trade for in the future $(P_{d+1})$. After the expected future price, that is the fair value, of each underlying is determined, the fair value of the mutual fund may be determined.

IV. Example of Regression Variables

The multivariate regression may evaluate numerous terms, that is variables, to determine the terms that are the most statistically significance in predicting future prices of an asset. The most relevant terms as determined by the regression analysis for an asset like Sony Corporation may include a technology industry index, a consumer products index, the Sony depository receipt, the iShare price for Japan, and the Nikkei Future price. The regression analysis for an other assets may identify other terms as statistically significant including:

1. a price for a U.S.-traded depositary receipts;
2. a price for a S&P 500 futures contracts;
3. a price for the NASDAQ 100 futures contract;
4. a price for the Russell 2000 index;
5. a price for several of the most relevant industry-specific market indices;
6. a price for several of the most relevant industry-specific depository receipts;
7. a price for several of the most relevant geographic-specific indices;
8. a price for the U.S. dollar to local currency exchange rate;
9. a price for a foreign market future; and
10. the difference between the last closing price and the bid-ask midpoint.

V. Valuation of an Underlying Asset

The following is an illustration of a valuation of an underlying asset of a mutual fund. Fidelity Investment's Telecommunications Sector Fund includes shares of Vodafone Group P.L.C. ("Vodafone"). Vodafone is a British telecommunication company traded on the London Stock Exchange as "VOD."

The result of a multivariate linear regression determined the seven most statistically significant terms, that is the independent variables, and the coefficient for each term for Vodafone. Table 2 summarizes the results of the regression analysis.

TABLE 2

Regression results for Vodafone

| Independent variable | Coefficient | Standard Error | T-Stat | P-value |
|---|---|---|---|---|
| Difference between ADR price at 4PM and local close in USD | 0.3117 | 0.1065 | 2.9 | 0.004 |
| Change in local close in USD | 0.0366 | 0.0766 | 0.5 | 0.633 |
| Change in ADR price | 0.0906 | 0.0809 | 1.1 | 0.263 |
| Change in USD-GBP exchange rate | 0.2059 | 0.2473 | 0.8 | 0.405 |
| Change in DJIA | 0.1412 | 0.1139 | 1.2 | 0.216 |
| Change in NASDAQ Computer index | 0.1907 | 0.0580 | 3.3 | 0.001 |
| Constant | 0.0003 | 0.0011 | 0.3 | 0.754 |

This regression analysis used data from prior to August 2000 with a sample size of 620 days. The dependent variable is tomorrow's close-to-close change in the local price of Vodafone calculated in U.S. dollars.

Tables 3 and 4 show the actual and predicted price change of Vodafone from August 1 to Aug. 31, 2000. The changes in price are based on the seven terms identified by the results of the regression analysis shown in Table 2. The correlation between the actual and predicted price change is 0.7531. The price changes are the price changes represented in the logarithm of the price, index, or exchange rate. An increase in the "USD-GBP rate" means the dollar appreciated relative to the British pound.

TABLE 3

Predicted price changes for August 2000 - part 1.

| | Tomorrow's price change | | Difference between ADR and local close price | Change in local price in USD | Change in ADR price |
|---|---|---|---|---|---|
| Date | Actual | Predicted | | | |
| 1-Aug-00 | −0.0372 | −0.0070 | −0.0054 | −0.0082 | −0.0044 |
| 2-Aug-00 | −0.0249 | −0.0136 | −0.0235 | −0.0372 | −0.0554 |
| 3-Aug-00 | 0.0573 | 0.0132 | 0.0182 | −0.0249 | 0.0168 |
| 4-Aug-00 | −0.0406 | −0.0048 | −0.0286 | 0.0573 | 0.0105 |
| 7-Aug-00 | 0.0097 | −0.0037 | −0.0153 | −0.0406 | −0.0273 |
| 8-Aug-00 | 0.0039 | 0.0067 | 0.0023 | 0.0097 | 0.0273 |
| 9-Aug-00 | −0.0141 | 0.0009 | −0.0001 | 0.0039 | 0.0015 |
| 10-Aug-00 | −0.0144 | −0.0099 | −0.0086 | −0.0141 | −0.0227 |
| 11-Aug-00 | 0.0235 | 0.0025 | 0.0027 | −0.0144 | −0.0031 |
| 14-Aug-00 | 0.0126 | 0.0079 | 0.0005 | 0.0235 | 0.0212 |
| 15-Aug-00 | 0.0000 | 0.0002 | −0.0016 | 0.0126 | 0.0105 |
| 16-Aug-00 | −0.0399 | −0.0023 | −0.0090 | 0.0000 | −0.0075 |
| 17-Aug-00 | −0.0114 | 0.0037 | 0.0082 | −0.0399 | −0.0227 |
| 18-Aug-00 | −0.0147 | −0.0019 | −0.0006 | −0.0114 | −0.0201 |
| 21-Aug-00 | −0.0164 | −0.0057 | −0.0177 | −0.0147 | −0.0317 |
| 22-Aug-00 | −0.0321 | −0.0032 | −0.0126 | −0.0164 | −0.0114 |
| 23-Aug-00 | 0.0334 | 0.0022 | 0.0014 | −0.0321 | −0.0181 |
| 24-Aug-00 | 0.0163 | 0.0091 | 0.0070 | 0.0334 | 0.0391 |
| 25-Aug-00 | −0.0005 | 0.0032 | 0.0050 | 0.0163 | 0.0143 |
| 28-Aug-00 | 0.0097 | 0.0070 | 0.0102 | −0.0005 | 0.0047 |
| 29-Aug-00 | −0.0047 | 0.0018 | −0.0026 | 0.0097 | −0.0031 |
| 30-Aug-00 | 0.0191 | −0.0036 | −0.0089 | −0.0047 | −0.0111 |
| 31-Aug-00 | 0.0816 | 0.0148 | 0.0125 | 0.0191 | 0.0405 |

TABLE 4

Predicted price changes for August 2000 - part II.

| Date | Change in USD-GBP exchange rate | Change in the DJIA | Change in NASDAQ computer index |
|---|---|---|---|
| 1-Aug-00 | −0.0030 | 0.0080 | −0.0288 |
| 2-Aug-00 | 0.0045 | 0.0076 | −0.0119 |
| 3-Aug-00 | −0.0015 | 0.0018 | 0.0348 |
| 4-Aug-00 | −0.0060 | 0.0057 | 0.0059 |
| 7-Aug-00 | −0.0015 | 0.0092 | 0.0192 |
| 8-Aug-00 | 0.0030 | 0.0101 | 0.0039 |
| 9-Aug-00 | 0.0015 | −0.0065 | 0.0050 |
| 10-Aug-00 | 0.0015 | 0.0003 | −0.0277 |
| 11-Aug-00 | −0.0030 | 0.0109 | 0.0065 |
| 14-Aug-00 | −0.0015 | 0.0134 | 0.0158 |
| 15-Aug-00 | 0.0000 | −0.0098 | 0.0018 |
| 16-Aug-00 | 0.0045 | −0.0053 | 0.0034 |
| 17-Aug-00 | 0.0000 | 0.0043 | 0.0195 |
| 18-Aug-00 | 0.0030 | −0.0008 | −0.0019 |
| 21-Aug-00 | 0.0015 | 0.0030 | 0.0111 |
| 22-Aug-00 | 0.0060 | 0.0053 | 0.0002 |
| 23-Aug-00 | 0.0030 | 0.0005 | 0.0190 |
| 24-Aug-00 | −0.0015 | 0.0034 | 0.0088 |
| 25-Aug-00 | 0.0044 | 0.0009 | −0.0087 |
| 28-Aug-00 | 0.0015 | 0.0054 | 0.0104 |
| 29-Aug-00 | 0.0088 | −0.0034 | 0.0045 |
| 30-Aug-00 | 0.0029 | −0.0100 | 0.0042 |
| 31-Aug-00 | 0.0000 | 0.0100 | 0.0251 |

VI. System for Determining Fair Value

Figure 3:
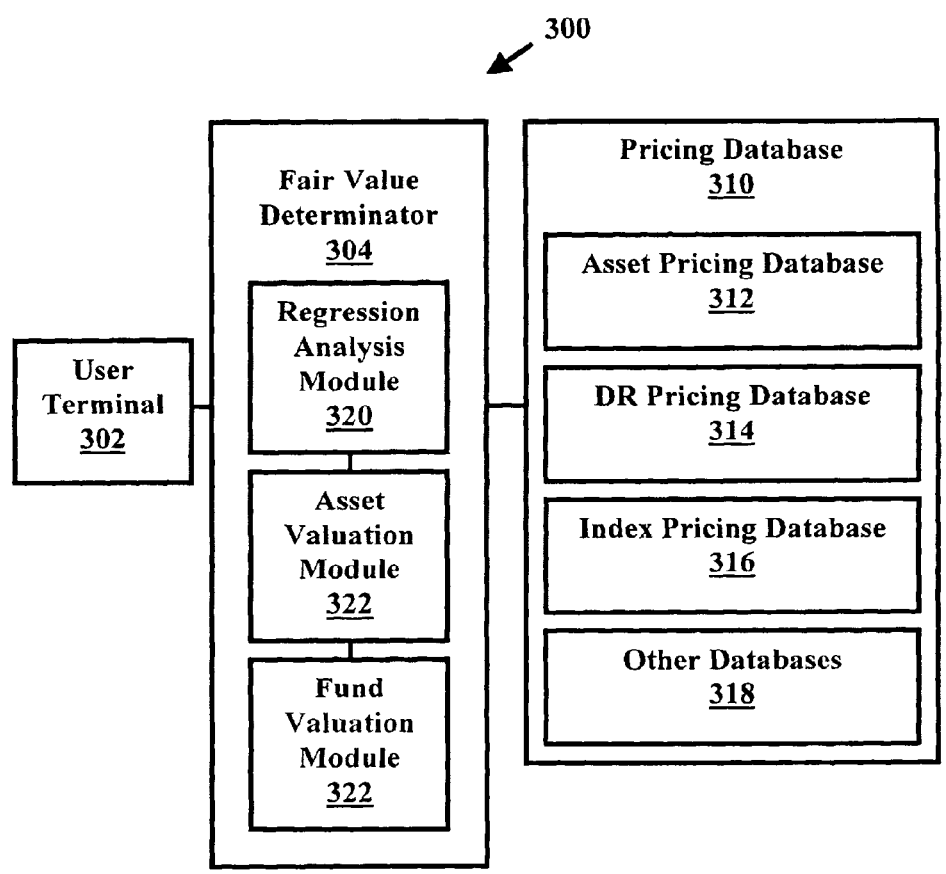
FIG. 3 illustrates a block diagram of a system for determining a fair-value of a fund.

FIG. 3 illustrates a block diagram of a fair-value determination system 300. A user at a user terminal 302 accesses a fair value determinator 304 that determines the fair value for a mutual fund based on the data in the pricing database 310. The pricing database 310 may include such databases as an asset pricing database 312 that includes current prices, up to 10 years of prior days closing prices, and other asset pricing data; a depositary receipt pricing database 314 that may include similar pricing data for various depositary receipts such as ADRs, GDRs, HOLDRs, and EuroDRs; a index pricing database 316; and other databases 318.

The user terminal 302, fair value determinator 304 and pricing database 310 may be integrated into a single computer. Alternatively, the pricing database 310 may include a plurality of different databases located on a variety of computers maintained be various entities. The user terminal 302 may be a personal computer that communicates with the fair value determinator 304 via the Internet. The results of the fair value determinator 304 may be provided to numerous terminals via the Internet or other networks such as a cellular telephone network in substantially real time.

The fair value determinator 304 may include such modules as a regression analysis module 320; an asset valuation module 322, and a fund valuation module 322. The regression analysis module 320 may be a software module that performs multivariate linear regression. The asset valuation module 322 may be a software module that determine a value of the underlying assets of a mutual fund. The underlying assets may include assets that are not currently being traded in a liquid market and other assets that are being traded in a liquid market. The fund valuation module 322 determines the value of the mutual fund. The fund valuation module 322 may determine the price of the mutual fund by using the value of each underlying asset as determined by the asset valuation module 322 and/or by other means.

The fair value determinator 304 may include multiple computers that may be operated by multiple different entities. For example, a first company may operate a computer that includes the regression analysis module 320. The first company may provide the coefficients and the selections of related assets to a second company that operates a computer that includes the asset valuation module 322. The second company's computer could receive the current pricing information for the related assets from the first company, a different company, or may generate the pricing information themselves. The second company's computer uses the coefficients and the current pricing information to generate the valuation of the assets. The second company or a third company may operate a computer that includes fund valuation module 322 uses the valuations of the assets and other data, such as the number of shares of each asset, prices for locally traded asset, valuations of the mutual fund's bonds, and the mutual fund's cash levels, to calculates the fair value of a mutual fund. In such an example, the user terminal 302 is optional.

The first company may receive a request file from the second company. The request file may identify a number of securities that the second company wishes to know the fair value of. For example, the first company may be a financial data provider and the second company may be a mutual fund company. Several of the mutual fund company's mutual funds may include the same asset, for example Sony Corporation. The request file may include only one request for the results of a regression analysis for Sony Corp. The mutual fund company may use the fair value of Sony Corp. to compute the fair value of all their mutual funds that include Sony Corp.

The financial data provider may send the mutual fund company a response file that includes the results of the regression analysis for some or all of the assets identified in the request file. The response file may include the fair value price of the assets, the regression coefficients, and/or other data.

The regression analysis module may determine the regression coefficients before 4:00 PM Eastern time. By determining the regression coefficients before the mutual fund can be valued, the regression coefficients may be transmitted to the mutual fund company earlier. This allows the mutual company more time to review the regression coefficients before the value their mutual finds is determined. Mutual fund companies often wish to have the values of their mutual funds calculated before 4:30 PM or 5:00 PM Eastern time so that the information can be provided to newspapers and other financial tracking and reporting entities for publication.

While preferred embodiments have been shown and described, it will be understood that they are not intended to limit the disclosure, but rather it is intended to cover all modifications and alternative methods and apparatuses falling within the spirit and scope of the invention as defined in the appended claims or their equivalents.

What is claimed is:

1. A computerized method for determining at an effective valuation time a fair value of a first market-traded security not currently trading in a liquid market, comprising:

electronically receiving historical price data, wherein said historical price data comprises data for a plurality of price-related time-dependent variables;

electronically performing a regression analysis on said historical price data; and electronically calculating at said effective valuation time a fair value of said first market-traded security based on said regression analysis and on values of one or more of said plurality of price-related time-dependent variables, said effective valuation time occurring when said first market-traded security is not currently trading in a liquid market, wherein the steps of electronically receiving, performing and calculating are processed on one or more computer processors.

2. A method as in claim 1, wherein said first security is assigned to a portfolio of securities, a second security is assigned to said portfolio of securities, and said second security is traded in a liquid market at said effective valuation time, further comprising assigning a fair value to said second security at said effective valuation time based on a recent trading price of said second security.

3. A method as in claim 1, wherein said regression analysis comprises an in-sample step-wise regression.

4. A method as in claim 1, wherein said step of electronically calculating a fair value comprises calculating a function of a recent closing price of said first security and a recent depositary receipt price for said first security.

5. A method as in claim 1, wherein said step of electronically calculating a fair value comprises calculating a function of a most recent closing price of said first security and a second most recent closing price of said first security.

6. A method as in claim 1, wherein said step of electronically calculating a fair value comprises calculating a rate of change of a securities market futures index price.

7. A method as in claim 1, wherein said step of electronically calculating a fair value comprises calculating a rate of change of a sector index price.

8. A method as in claim 1, wherein said step of electronically calculating a fair value comprises selecting a subset of one or more variables from said plurality of variables, wherein said one or more variables have recently proven reliable in predicting an opening price for said first security.

9. A method as in claim 8, wherein said one or more variables that have recently proven reliable in predicting an opening price have proven more reliable than others of said plurality of variables.

10. A method as in claim 8, wherein said one or more variables that have recently proven reliable in predicting an opening price are different from one or more variables previously selected.

11. A method as in claim 2, wherein said portfolio of securities is held by a mutual fund, and further comprising calculating a fair value of said mutual fund at said effective valuation time based in part on fair values calculated for said first and second assets.

12. A computerized method for determining a fair value of a security traded on a securities market that is open part of the time and closed part of the time, at an effective valuation time when said security is not actively traded on said market, comprising:

electronically receiving prices of said security during a plurality of periods when said market was open; electronically receiving historical market data for a plurality of financial asset market based time-dependent variables other than prices for said first security;

electronically performing a regression analysis on said historical market data and said prices of said security during a plurality of periods when said market was open; and electronically calculating a fair value of said first security at said valuation time based on said regression analysis and on a price for said security during a period when said market was last open;

wherein the steps of electronically receiving, performing and calculating are processed on one or more computer processors.

13. A method as in claim 1, wherein said step of electronically calculating a fair value comprises calculating a change in a securities market futures index price.

14. A method for determining at an effective valuation time fair values of securities held in a portfolio of securities, said portfolio comprising securities in a first group and securities in a second group, wherein each security in said first group is a security that is not being actively traded on a securities market at said effective valuation time, and wherein each security in said second group is a second security that is being actively traded on said securities market at said effective valuation time, said method comprising: for each security in said first group, calculating a fair value of that security at said effective valuation time using the method of claim 12, and; for each security in said second group, setting a fair value of that security at said effective valuation time to be equal to a market value of that security on said market.

\* \* \* \* \*